United States Patent [19]

Sanada

[11] Patent Number: 5,469,315
[45] Date of Patent: Nov. 21, 1995

[54] MAGNETIC HEAD POSITIONER FOR A MAGNETIC DISK APPARATUS WITH LOW LOAD TORQUE

[75] Inventor: Yotaro Sanada, Tokyo, Japan

[73] Assignee: NEC Corporation, Tokyo, Japan

[21] Appl. No.: 250,455

[22] Filed: May 27, 1994

[30] Foreign Application Priority Data

May 27, 1993 [JP] Japan ................................. 5-148597

[51] Int. Cl.$^6$ ........................................... G11B 5/55
[52] U.S. Cl. .................................. 360/106; 360/97.01
[58] Field of Search ........................ 360/106, 86, 97.01, 360/98.01, 101, 109; 369/222, 250, 255

[56] References Cited

U.S. PATENT DOCUMENTS

| | | | |
|---|---|---|---|
| 5,016,131 | 5/1991 | Riggle et al. | 360/98.01 |
| 5,247,410 | 9/1993 | Ebihara et al. | 360/106 |

FOREIGN PATENT DOCUMENTS 54-138415  10/1979  Japan ..................... 360/106

Primary Examiner—Stuart S. Levy
Assistant Examiner—Craig A. Renner
Attorney, Agent, or Firm—Sughrue, Mion, Zinn, Macpeak & Seas

[57] ABSTRACT

A magnetic head positioner for a magnetic disk apparatus has a holder arm for swinging a plurality of magnetic heads mounted on one end thereof for reading and writing data, the holder arm having a center portion thereof provided with a cylindrical boss portion, a fixed shaft provided on a center axis of the cylindrical boss portion of the holder arm and acting as a center axis of the swing motion of the holder arm, a cylindrical sleeve interposed between the holder arm and the fixed shaft and rotatably supported on the fixed shaft with a predetermined gap with respect to an inner side surface of the cylindrical boss portion of the holder arm, the cylindrical sleeve having flange members at opposite end portions thereof covering the cylindrical boss portion with a predetermined gap with respect thereto and a motor mounted in between the fixed shaft and the cylindrical sleeve for generating force for rotating the cylindrical sleeve about the shaft. On either of the holder arm or the cylindrical sleeve, grooves for generating dynamic hydraulic pressure are formed and configuration of the grooves is an outward type, an inward type or a herringbone type configuration.

11 Claims, 4 Drawing Sheets

MAGNETIC HEAD POSITIONER FOR A MAGNETIC DISK APPARATUS WITH LOW LOAD TORQUE

BACKGROUND OF THE INVENTION

1. Field of the Invention

The present invention relates to a magnetic disk apparatus for use in an information processing device, and, particularly, to a magnetic head positioner for positioning a plurality of magnetic heads mounted on a holder arm in predetermined positions corresponding to a plurality of magnetic disk media, respectively, by swinging the holder arm.

2. Description of the Related Art

Referring to FIG. 1, a conventional magnetic head positioner has a holder arm 51 on which a plurality of magnetic heads 60 for reading and writing data magnetically are mounted at one end portion thereof and swings with respect to a plurality of magnetic disk media, a shaft 52 acting as a center axis of the swinging movement of the holder arm 51, a plurality of bearings 53 and 54 interposed between the holder arm 51 and the shaft 52 for rotatably supporting the holder arm 51 and a voice coil motor 70 for generating force necessary to swing the holder arm 51.

The voice coil motor 70 has a coil 71 mounted on the other end of the holder arm 51, a magnet 72 and a yoke 73 which, together with the coil 71, constitutes a magnetic circuit for the coil 71.

However, the conventional magnetic head positioner has a following disadvantage.

Since the holder arm repeatedly swings for positioning the magnetic heads, grease filing a space between the pair of bearings may be unevenly distributed. As a result of such uneven distribution of grease, mechanical resistance is increased and considerable load is applied to the bearings interposed between the holder arm and the shaft when the holder arm is swung, causing the life of the bearings to be shortened considerably.

SUMMARY OF THE INVENTION

It is therefore an object of the present invention to eliminate the above-mentioned disadvantage and provide a magnetic head positioner which is capable of achieving a high speed and highly precise magnetic head positioning by removing irregular mechanical resistance occurring during swinging movement of a holder arm thereof due to uneven distribution of grease in a bearing portion thereof.

According to the present invention, there is provided a magnetic head positioner comprising: a holder arm for swinging a plurality of magnetic heads mounted on one end portion thereof for reading and writing data, the holder arm having a cylindrical boss portion in a center portion thereof; a fixed shaft provided on a center axis of the cylindrical boss portion of the holder arm and acting as a center axis of the swing motion of the holder arm; a cylindrical sleeve interposed between the holder arm and the fixed shaft, rotatably supported on the fixed shaft with a predetermined gap with respect to an inner peripheral surface of the cylindrical boss portion of the holder arm and having flange members at opposite end portions thereof covering the cylindrical boss portion with a predetermined gap with respect thereto; and a motor mounted in between the fixed shaft and the cylindrical sleeve for generating force for rotating the cylindrical sleeve about the shaft.

BRIEF DESCRIPTION OF THE DRAWINGS

The features and advantages of the present invention will become apparent from the following description when taken in conjunction with the accompanying drawings in which.

In the drawings, the same reference numerals respectively denote the same structural elements.

DETAILED DESCRIPTION OF THE PREFERRED EMBODIMENTS

An embodiment of the present invention will be described in detail with reference to the drawings.

Figure 1:
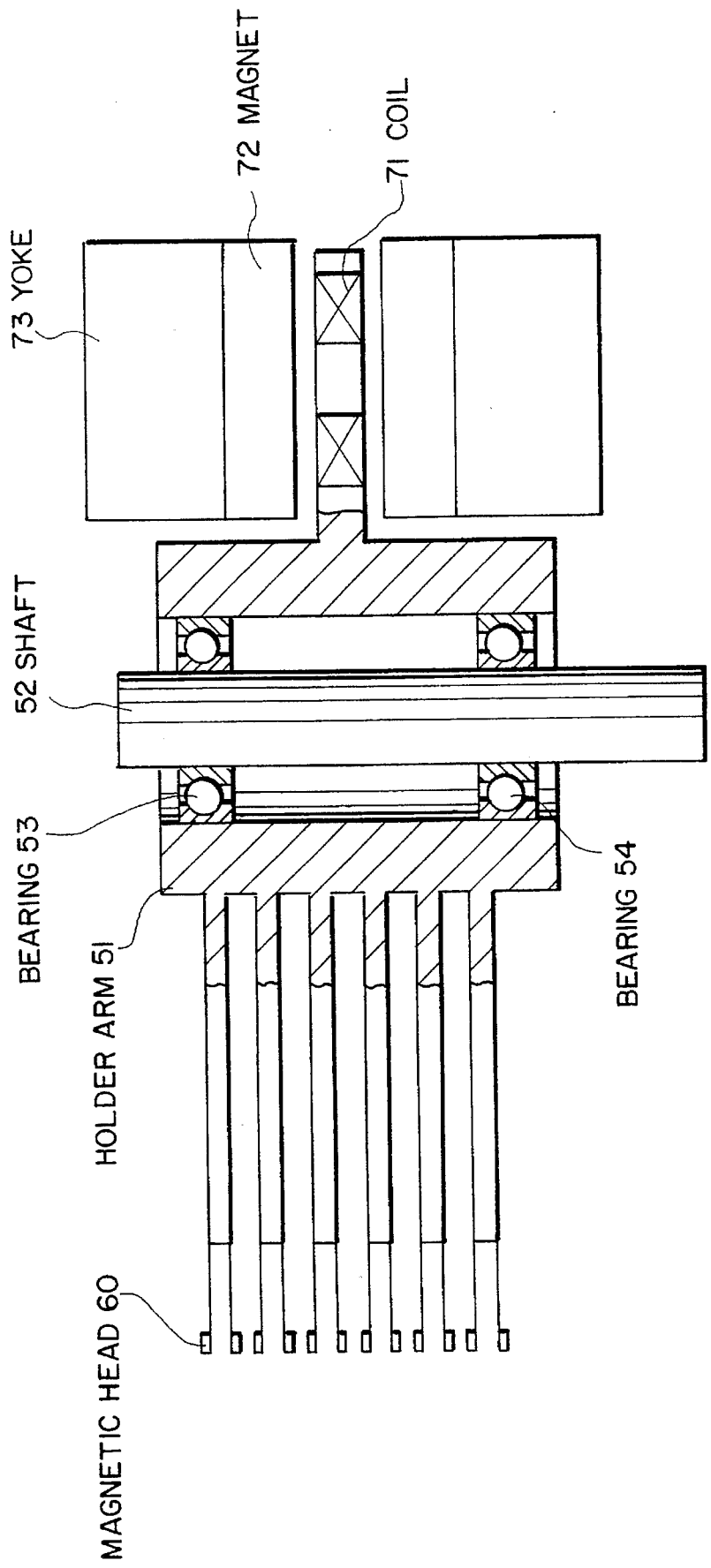
FIG. 1 is a longitudinal cross section of a conventional magnetic head positioner.
Figure 2:
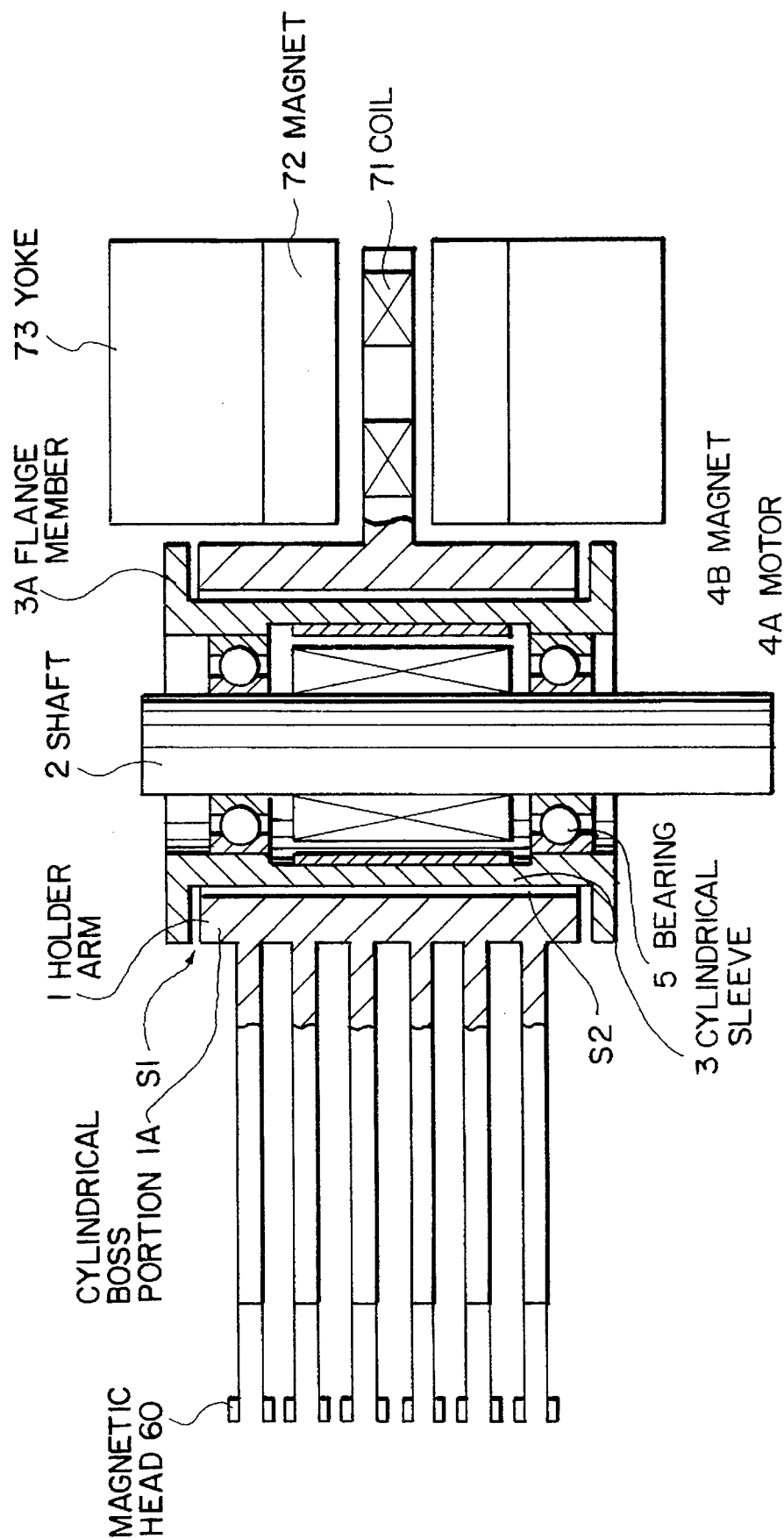
FIG. 2 is a longitudinal cross section of an embodiment of a magnetic head positioner according to the present invention.

Referring to FIG. 2, a magnetic head positioner according to an embodiment of the present invention has a holder arm 1 for swinging a plurality of magnetic heads 60 mounted on one end portion thereof for magnetically reading and writing data with respect to a plurality of magnetic disk media, the holder arm having a center portion provided with a cylindrical boss portion 1A, a fixed shaft 2 provided on a center axis of the cylindrical boss portion 1A of the holder arm 1 and acting as a center axis of the swing motion of the holder arm 1, a cylindrical sleeve 3 interposed between the holder arm 1 and the fixed shaft 2, rotatably supported on the fixed shaft 2 with a small gap S2 with respect to an inner peripheral surface of the cylindrical boss portion 1A of the holder arm 1, the cylindrical sleeve 3 having flange members 3A at opposite end portions thereof covering the cylindrical boss portion 1A with a small gap S1 with respect thereto, a motor 4 mounted in between the fixed shaft 2 and the cylindrical sleeve 3 for generating force for rotating the cylindrical sleeve 3 about the shaft, a pair of bearings 5 interposed between the shaft 2 and the cylindrical sleeve 3 for rotatably supporting the cylindrical sleeve 3 and a voice coil motor 70 for generating force to swing the holder arm 1.

The small gap S1 formed between the opposite end portions of the cylindrical boss portion 1A of the holder arm 1 and the respective flange portions 3A of the cylindrical sleeve 3 and the small gap S2 formed between the inner side surface of the holder arm 1 and an outer side surface of the cylindrical sleeve 3 are selected such that a predetermined dynamic hydraulic pressure is generated by rotation of the cylindrical sleeve 3 by the motor 4. For example, the small gaps S1 and S2 are preferably about 1–5 microns, respectively, when the fluid used is air and preferably about 10–30 microns when fluid used is grease.

Rotation speed of the cylindrical sleeve 3 driven by the motor 4 is preferably about 10,000–20,000 rpm when air is used as fluid and preferably about 6,000–10,000 rpm when grease is used as fluid.

The holder arm 1 may be made of a material including aluminum and the shaft 2 and the bearings 5 may be made of a material including stainless steel. The cylindrical sleeve 3 may be made of a material including copper, for example, brass.

Figure 3:
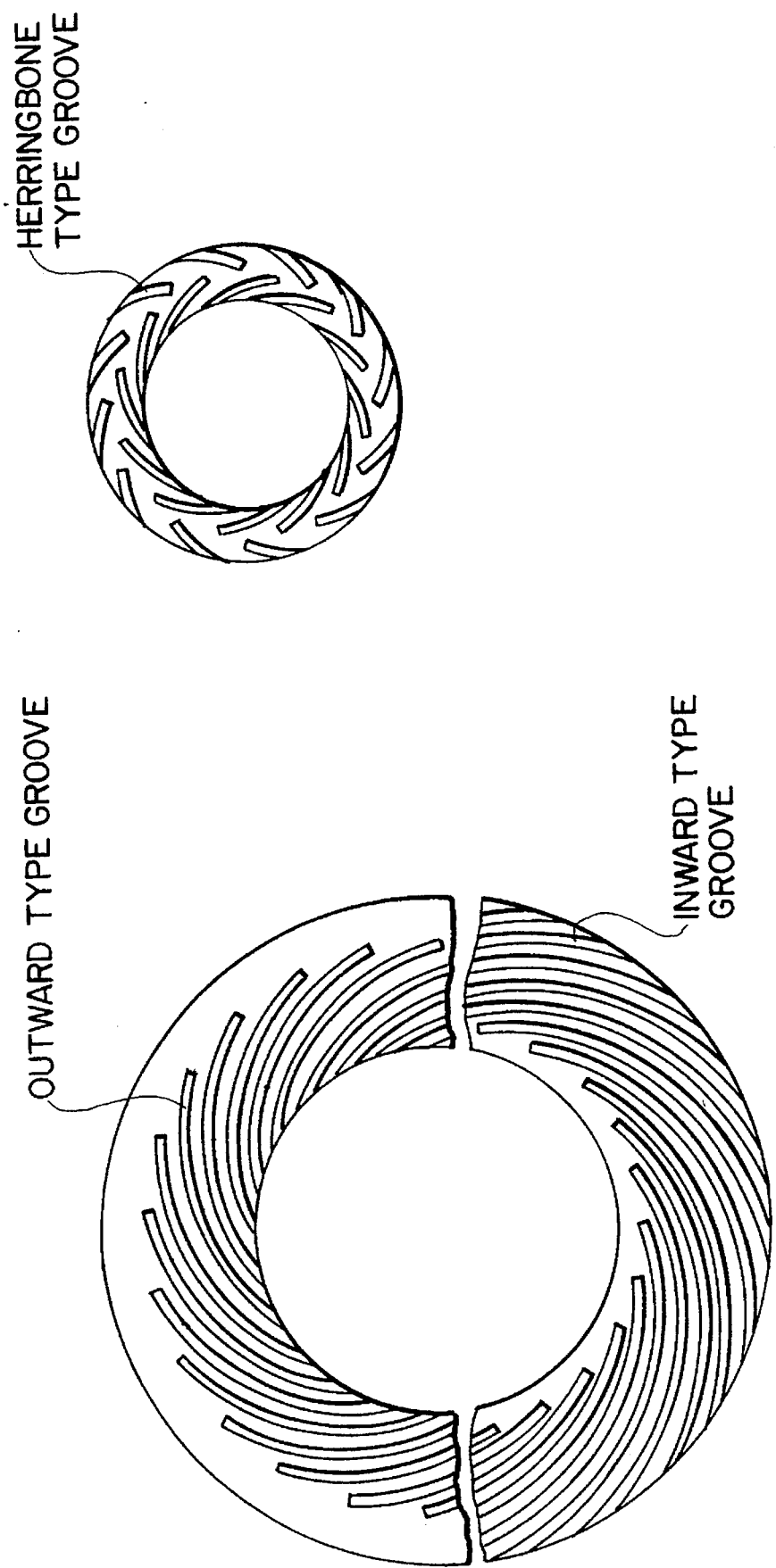
FIG. 3 is an illustrative diagram showing groove configuration for generating dynamic hydraulic pressure between a holder arm 1 and a cylindrical sleeve 3 shown in FIG. 1.

It is necessary, in order to generate dynamic hydraulic pressure between the holder arm 1 and the cylindrical sleeve 3, to form grooves in at least one of the holder arm 1 and the cylindrical sleeve 3. Such grooves are formed on the flange members 3A and the outer peripheral surface of the cylindrical sleeve 3. Configuration of the grooves may be outward type, inward type or herring-bone type as shown in FIG. 3, the herringbone type grooves are employed in the embodiment.

The motor 4 driving the cylindrical sleeve 3 is provided on a center portion on the inner diameter side of the cylindrical sleeve 3. The motor 4 includes a motor coil 4A fixed to the shaft 2 and a permanent magnet 4B fixed to the inner side surface of the cylindrical sleeve 3 in an opposing relation to the motor coil 4A to repulsively drive the latter.

When the motor 4 is actuated by supplying electric current to the motor coil, the cylindrical sleeve 3 rotates about the shaft 2. In this case, dynamic hydraulic pressure is generated in the small gaps S1 between the flange members 3A of the cylindrical sleeve 3 and the respective opposite end portions of the cylindrical boss portion 1A of the holder arm 1 due to air layer, resulting in dynamic hydraulic pressure bearing in a thrust direction. Simultaneously therewith, dynamic hydraulic pressure is also generated in the small gap S2 between the inner side surface of the cylindrical boss portion 1A of the holder arm 1 and the outer side surface of the cylindrical sleeve 3 due to air layer, resulting in dynamic hydraulic pressure bearing in a radial direction. That is, the holder arm 1 is positioned in the thrust direction in the order of several microns while being freely rotatable with substantially no load in the radial direction.

When air exists in the small gaps S1 and S2 between the holder arm 1 and the cylindrical sleeve 3, the embodiment can be used in a magnetic disk device which performs a high speed seek operation, since frictional torque becomes very small. Alternatively, when grease exists in the small gaps S1 and S2 between the holder arm 1 and the cylindrical sleeve 3, the embodiment can be used in a large capacity magnetic disk device, since bearing rigidity becomes very large.

Figure 4:
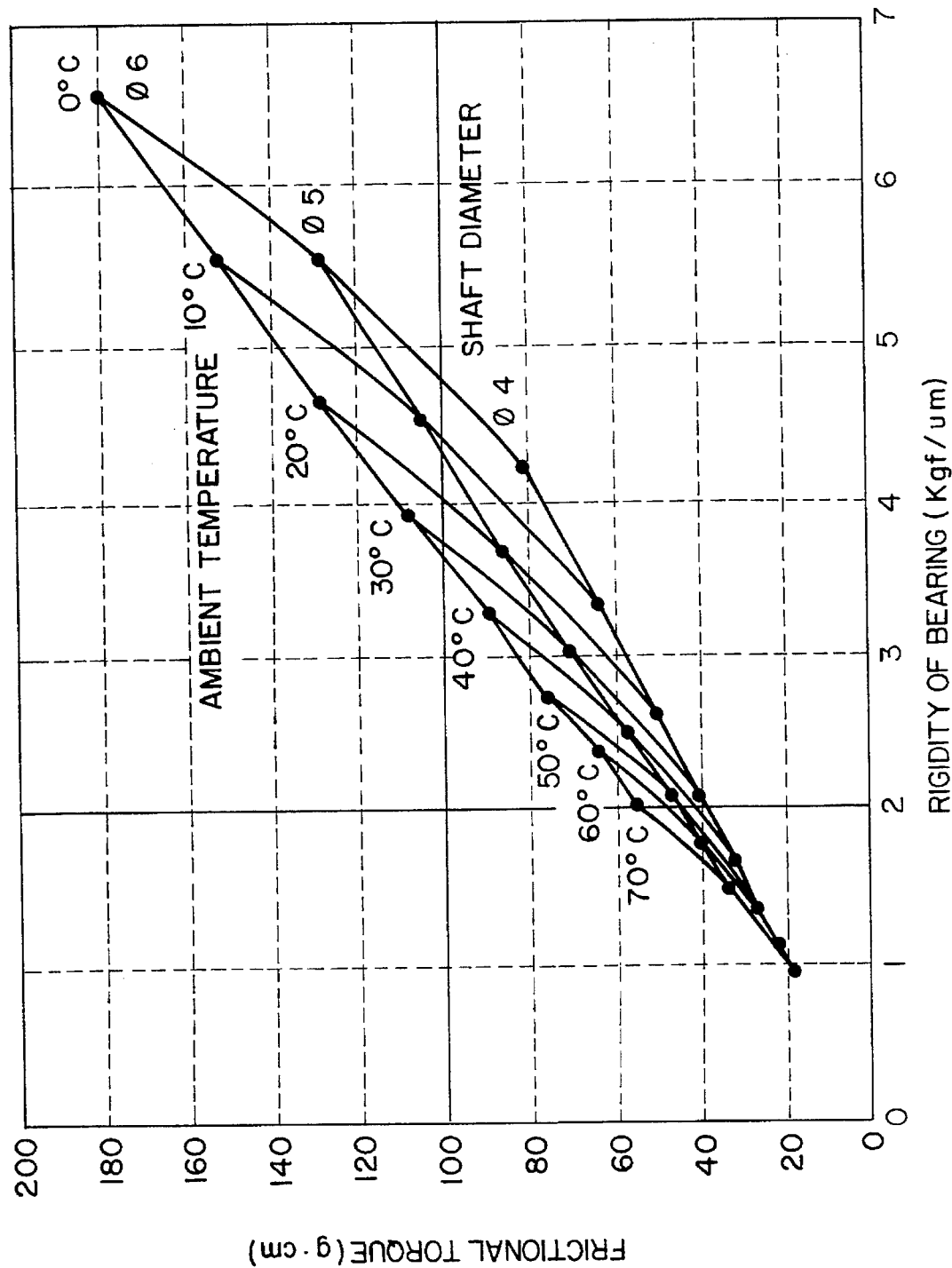
FIG. 4 is a graph showing a relationship between frictional torque, rigidity of bearing, ambient temperature and diameter of a shaft.

FIG. 4 is a graph showing a relationship between frictional torque, rigidity of bearing, ambient temperature and diameter of a shaft, based on data obtained by experiments conducted on the embodiment. In FIG. 4, the bearing rigidity and frictional torque which are required in a high performance magnetic disk device are approximately 2 kgf/μm or higher and 100 g.cm or smaller, respectively. In order to satisfy this condition, it is enough to set the diameter of the shaft to about 5 mm or smaller.

As described hereinbefore, the magnetic head positioner according to the present invention, in which dynamic hydraulic pressure is generated in the small gaps between the holder arm and the cylindrical sleeve, can prevent irregular mechanical resistance from being added to the holder arm, so that load torque generated during swinging movement of the holder arm can be made very small. Therefore, operation speed and positioning accuracy of the magnetic head positioner can be improved, respectively.

While the present invention has been described in conjunction with the preferred embodiments thereof, it will now be readily possible for those skilled in the art to put the invention into practice in various other manners.

What is claimed is:

1. A magnetic head positioner for a magnetic disk apparatus, comprising:

a holder arm having a plurality of magnetic heads mounted on one end thereof for reading and writing data, and a cylindrical boss portion in a center portion thereof;

positioning means coupled to the holder arm for intermittently positioning the plurality of magnetic heads;

a fixed shaft provided on a center axis of said cylindrical boss portion of said holder arm and acting as a center axis of a swinging motion of said holder arm;

a cylindrical sleeve interposed between said holder arm and said fixed shaft and rotatably supported on said fixed shaft with a first predetermined gap formed between an inner peripheral surface of said cylindrical boss portion of said holder arm and an outer peripheral surface of said cylindrical sleeve, said cylindrical sleeve having flange members at opposite end portions thereof sandwiching said cylindrical boss portion with a second predetermined gap formed between opposite end portions of said cylindrical boss portion and respective flange members; and a motor mounted between said fixed shaft and said cylindrical sleeve which generates force to continuously rotate said cylindrical sleeve about said shaft and create dynamic hydraulic pressure in said first and second predetermined gaps, whereby the holder arm is freely rotatable with substantially no load in the radial direction thereof.

2. The magnetic head positioner for a magnetic disk apparatus as claimed in claim 1, wherein said holder arm is formed, on the inner peripheral surface thereof and on the opposite end portions of said cylindrical boss portion thereof, with grooves for assisting in generating said dynamic hydraulic pressure.

3. The magnetic head positioner for a magnetic disk apparatus as claimed in claim 2, wherein the configuration of said grooves is one of an outward type, an inward type and a herring-bone type configuration.

4. The magnetic head positioner for a magnetic disk apparatus as claimed in claim 1, wherein grooves for assisting in generating said dynamic hydraulic pressure are formed on said flange members of said cylindrical sleeve and on the outer peripheral surface of said cylindrical sleeve.

5. The magnetic head positioner for a magnetic disk apparatus as claimed in claim 4, wherein the configuration of said grooves is one of an outward type, an inward type and a herring-bone type configuration.

6. The magnetic head positioner for a magnetic disk apparatus as claimed in claim 1, wherein said positioning means includes a voice coil motor for generating a force for swinging said holder arm about a center axis of said fixed shaft.

7. The magnetic head positioner for a magnetic disk apparatus as claimed in claim 6, wherein said voice coil motor comprises a coil mounted on said holder arm at an end opposite said plurality of magnetic heads, a magnet and a yoke being arranged in an opposing relation to said coil to form a magnetic circuit.

8. The magnetic head positioner for a magnetic disk apparatus as claimed in claim 1, wherein said holder arm, said fixed shaft and said cylindrical sleeve are made of a material including aluminum, a material including stainless steel and a material including copper, respectively.

9. The magnetic head positioner for a magnetic disk apparatus as claimed in claim 1, wherein said motor comprises a motor coil fixed to said fixed shaft at a center portion thereof relative to said cylindrical sleeve, and a permanent magnet fixed to the inner side surface of said cylindrical sleeve in an opposing relation to said motor coil for being repulsively driven by said motor coil.

10. The magnetic head positioner for a magnetic disk apparatus as claimed in claim 1, wherein said first and second gaps are filled with grease.

11. The magnetic head positioner for a magnetic disk apparatus as claimed in claim 1, wherein said first and second gaps are maintained when said motor is activated.

* * * * *